United States Patent
Gossain et al.

(10) Patent No.: US 7,801,143 B2
(45) Date of Patent: Sep. 21, 2010

(54) SYSTEM AND METHOD FOR GROUPCAST PACKET FORWARDING IN A WIRELESS NETWORK

(75) Inventors: Hrishikesh Gossain, Apopka, FL (US); William V. Hasty, Lake Mary, FL (US); Surong Zeng, Altamont Springs, FL (US); Heyun Zheng, Debary, FL (US)

(73) Assignee: Motorola, Inc., Schaumburg, IL (US)

( * ) Notice: Subject to any disclaimer, the term of this patent is extended or adjusted under 35 U.S.C. 154(b) by 1088 days.

(21) Appl. No.: 11/383,130

(22) Filed: May 12, 2006

(65) Prior Publication Data

US 2007/0263559 A1 Nov. 15, 2007

(51) Int. Cl.
*H04L 12/28* (2006.01)
(52) U.S. Cl. ............... 370/394; 370/356; 370/389; 370/395.31; 455/428
(58) Field of Classification Search .......... 370/394, 370/356, 389, 395.31; 455/428
See application file for complete search history.

(56) References Cited

U.S. PATENT DOCUMENTS

| 6,647,001 | B1* | 11/2003 | Bhagavath et al. | 370/331 |
|---|---|---|---|---|
| 2002/0122410 | A1* | 9/2002 | Kulikov et al. | 370/349 |
| 2004/0100963 | A1* | 5/2004 | Guo | 370/394 |
| 2005/0041628 | A1* | 2/2005 | Duggi et al. | 370/338 |
| 2005/0175007 | A1* | 8/2005 | Park et al. | 370/390 |
| 2005/0175009 | A1* | 8/2005 | Bauer | 370/390 |
| 2005/0232298 | A1* | 10/2005 | Beverly et al. | 370/463 |
| 2005/0243817 | A1* | 11/2005 | Wrenn et al. | 370/389 |
| 2005/0243830 | A1* | 11/2005 | Wrenn et al. | 370/394 |
| 2006/0002328 | A1* | 1/2006 | Naghian | 370/328 |
| 2006/0198308 | A1* | 9/2006 | Vasseur et al. | 370/238 |
| 2006/0265480 | A1* | 11/2006 | Kim et al. | 709/220 |
| 2007/0104123 | A1* | 5/2007 | Tomici et al. | 370/310 |
| 2008/0049703 | A1* | 2/2008 | Kneckt et al. | 370/342 |
| 2009/0245247 | A1* | 10/2009 | Nakamura et al. | 370/389 |

OTHER PUBLICATIONS

Sze-Yao Ni et al—The Broadcast Storm Problem in a Mobile ad Hoc Network, Department. of Computer Science and Information Engineering, National Central University, Taiwan—1999—pp. 151-162.
PCT/US07/66754, PCT Search Report and Written Opinion, mailed Sep. 26, 2008, 8 pages.
PCT/US07/66754, PCT Preliminary Report on Patentability, mailed Nov. 27, 2008, 8 pages.

* cited by examiner

*Primary Examiner*—Nick Corsaro
*Assistant Examiner*—Babar Sarwar
(74) *Attorney, Agent, or Firm*—Randi L. Karpinia

(57) ABSTRACT

A multi-hop wireless network includes an originator node, a proxy node, and at least one other node. The originator node generates a data packet and transmits the data packet to the proxy node. The proxy node receives and forwards to the at least one other node the data packet including an originator node address and a proxy node sequence number for an end-to-end groupcast sequence number.

19 Claims, 6 Drawing Sheets

SYSTEM AND METHOD FOR GROUPCAST PACKET FORWARDING IN A WIRELESS NETWORK

CROSS-REFERENCE TO RELATED APPLICATION

Related subject matter is disclosed in U.S. Patent Publication No. 20080205385A1 entitled "Data Frame Formats to Improve Groupcast Efficiency in Multi-Hop Wireless Networks", published on Aug. 28, 2008.

FIELD OF THE INVENTION

The present invention relates generally to multi-hop communication networks, and in particular to forwarding groupcast packets in the presence of proxies within a multi-hop communication network.

BACKGROUND

An infrastructure-based wireless network typically includes a communication network with fixed and wired gateways. Many infrastructure-based wireless networks employ a mobile unit or host which communicates with a fixed base station that is coupled to a wired network. The mobile unit can move geographically while it is communicating over a wireless link to the base station. When the mobile unit moves out of range of one base station, it may connect or "handover" to a new base station and starts communicating with the wired network through the new base station.

In comparison to infrastructure-based wireless networks, such as cellular networks or satellite networks, ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network.

One characteristic of the nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multi-hopping") until the packets reach the destination node. In such situations, each intermediate node routes the packets (e.g., data and control information) to the next node along the route, until the packets reach their final destination. For relaying packets to the next node, each node maintains routing information collected through communication with neighboring nodes. The routing information can also be periodically broadcast in the network to reflect the current network topology. Alternatively, to reduce the amount of information transmitted for maintaining accurate routing information, the network nodes may exchange routing information only when it is needed. In an approach known as Mesh Scalable Routing (MSR), nodes periodically send HELLO messages (e.g., once per second) that contain routing information and metrics associated with each route. Mobile nodes use information extracted from the HELLO messages to decide the most efficient manner for performing handoff.

A wireless mesh network is a collection of wireless nodes or devices organized in a decentralized manner to provide range extension by allowing radios to be reached across multiple hops. In a multi hop network, communication packets sent by a source node are relayed through one or more intermediary nodes before reaching a destination node.

A large network can be realized by using infrastructure nodes intelligent access points (IAP), which provides wired backhaul to the wireless nodes. Multiple IAP can be connected to the same local area network (LAN) segment to provide wired backhaul.

Wireless adhoc networks can include both routable (meshed) nodes and non-routable (non-meshed) nodes. Meshed devices are devices which may follow a standard wireless protocol such as IEEE 802.11 or IEEE 802.15. These devices are responsible for forwarding packets to/from the proxy devices which are associated with them. Non-meshed devices are devices following a standard wireless protocol such as IEEE 802.11 or IEEE 802.15 but not participating in any kind of routing. These devices are "proxied" by meshed devices, which establish routes for them.

The mobility of a multihop ad hoc wireless network causes groupcast operations (i.e. broadcast and multicast communication) to occur more frequently than in other communication networks. The purpose of groupcasting a message is to make sure that the groupcast reaches all nodes of interest in the network and is not unnecessarily dropped. Due to the mobile nature of the ad hoc network, groupcasting of messages can cause network problems including redundancy, contention, and collision. Together, these type of issues are referred to by those skilled in the art as a "broadcast storm" problem. In the worst case scenario, a broadcast storm may shut down an entire network.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
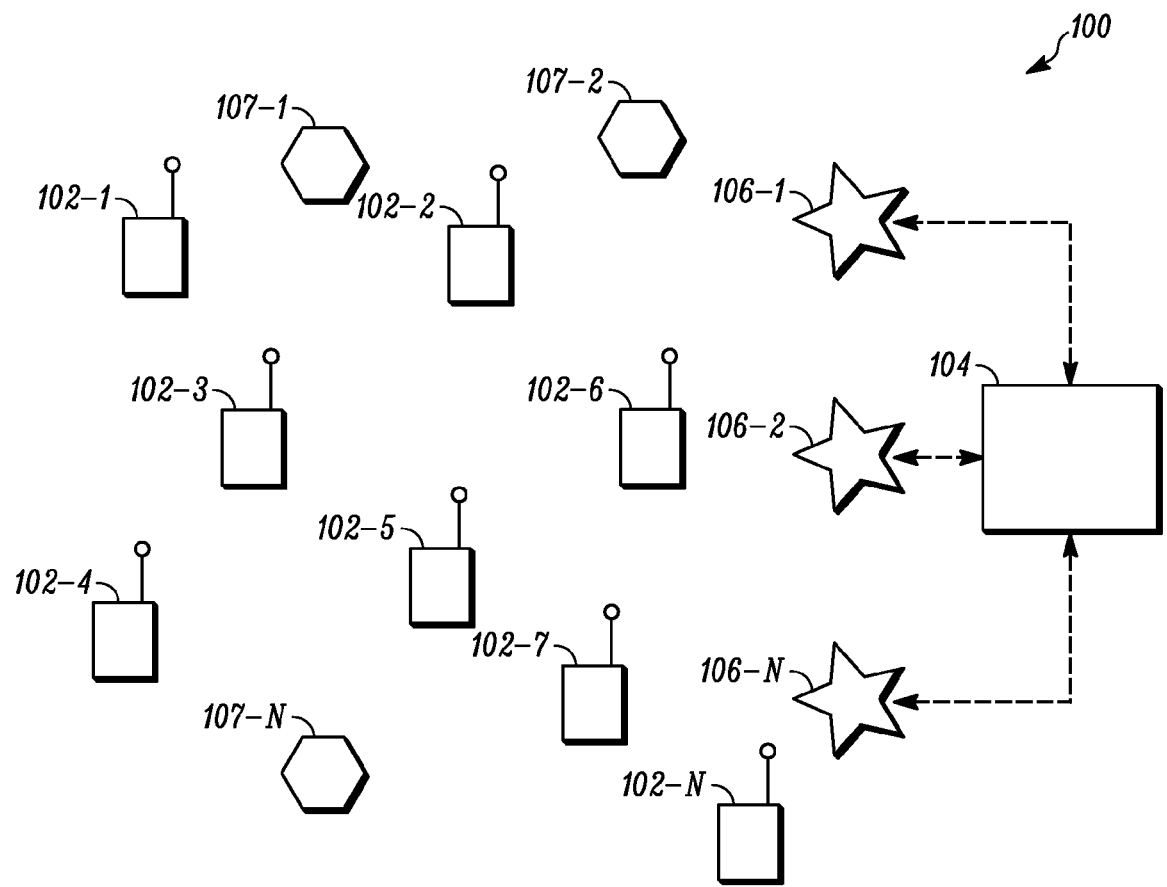
FIG. 1 is a block diagram of an example ad-hoc wireless communications network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to groupcast packet forwarding. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of groupcast packet forwarding described herein. The non-processor circuits may include, but are not limited to, a radio receiver, a radio transmitter, signal drivers, clock circuits, power source circuits, and user input devices. As such, these functions may be interpreted as steps of a method to perform groupcast packet forwarding. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

To support multihop packet forwarding in a wireless environment, existing implementations of ad hoc routing schemes generally use a proxy based approach wherein a non-routable device (e.g. an 802.11 station (STA)) is proxied by a routable device (e.g. an access point (AP) capable of routing). The routable device, or proxy, is responsible for forwarding data packets on behalf of the non-routable device. Given such a network, the methodology for forwarding groupcast (including broadcast and multicast) packets becomes non-trivial. In particular, the methodology for setting a sequence number of a groupcast packet is critical to the overall network performance. Sequence numbers in groupcast packets are utilized to allow for selectively discarding duplicate data packets to minimize the potential for a broadcast storm problem.

The present invention provides a method of using sequence numbers for groupcast packets in the presence of proxies in a multi-hop wireless network. When an access point (AP) forwards a groupcast packet, it selects whether to utilize its own sequence number or the sequence number of the initiator node to forward the groupcast packet. The decision making process of the present invention includes consideration of the behavior of groupcast packets generated by higher layers as well as media access control (MAC) layers. In one embodiment, the decision making process of the present invention adapts for initiator node movement (i.e. mobile initiator) from one routable node to another routable node. In another embodiment, the decision making process of the present invention includes taking into account a static non-routable initiator node being proxied by a routable node (either static or mobile). In a further embodiment, the decision making process of the present invention adapts for the proxying of a static non-routable initiator node changing from one mobile routable node to another routable node due to the movement of the mobile routable node away from the static initiator node.

FIG. 1 is a block diagram illustrating an example of a communication network 100 employing an embodiment of the present invention. For illustration purposes, the communication network 100 comprises an adhoc wireless communications network. For example, the adhoc wireless communications network can be a mesh enabled architecture (MEA) network or an 802.11 network (i.e. 802.11a, 802.11b, 802.11g, or 802.11s) It will be appreciated by those of ordinary skill in the art that the communication network 100 in accordance with the present invention can alternatively comprise any packetized communication network. For example, the communication network 100 can be a network utilizing packet data protocols such as TDMA (time division multiple access), GPRS (General Packet Radio Service) and EGPRS (Enhanced GPRS).

As illustrated in FIG. 1, the communication network 100 includes a plurality of mobile nodes 102-1 through 102-n (referred to generally as nodes 102 or mobile nodes 102 or mobile communication devices 102), and can, but is not required to, include a fixed network 104 having a plurality of intelligent access points (IAP) 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, a public switched telephone network (PSTN) and the Internet. The communication network 100 further can include a plurality of fixed routers 107-1 through 107-n (referred to generally as nodes 107 or fixed routers 107 or fixed communication devices 107) for routing data packets between other nodes 102, 106 or 107. It is noted that for purposes of this discussion, the nodes discussed above can be collectively referred to as "nodes 102, 106 and 107", or simply "nodes" or alternatively as "communication devices."

As can be appreciated by one skilled in the art, the nodes 102, 106 and 107 are capable of communicating with each other directly, or via one or more other nodes 102, 106 or 107 operating as a router or routers for packets being sent between nodes.

Figure 2:
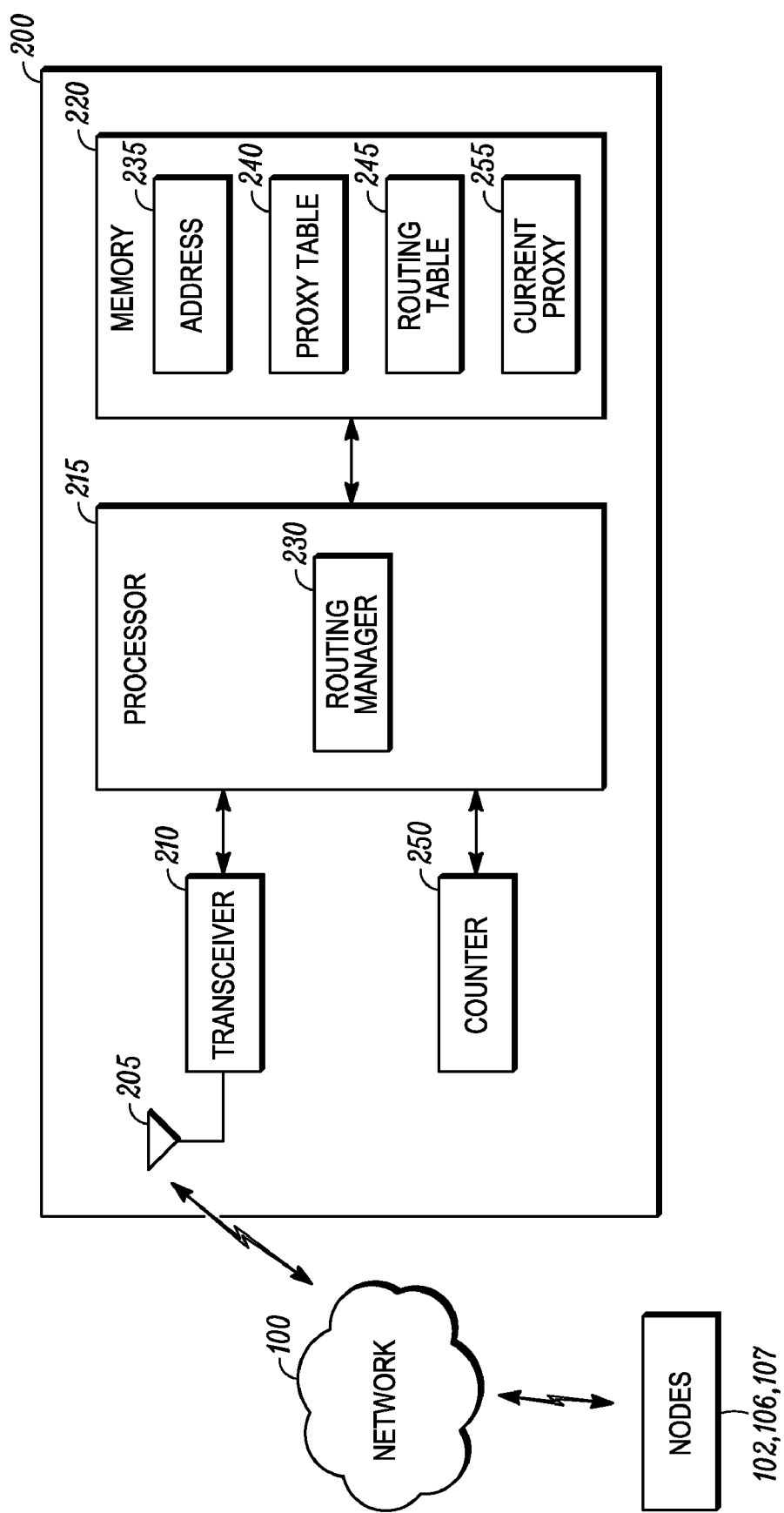
FIG. 2 is a block diagram illustrating an example of a node employed in the network shown in FIG. 1.

FIG. 2 is an electronic block diagram of one embodiment of a communication device 200 in accordance with the present invention. The communication device 200, for example, can exemplify one or more of the nodes 102, 106, and 107 of FIG. 1. In accordance with some embodiments of the present invention, the communication device 200 can be a mesh routable device or alternatively can be a non-meshed non-routable device. As illustrated, the communication device 200 includes an antenna 205, a transceiver (or modem) 210, a processor 215, and a memory 220.

The antenna 205 intercepts transmitted signals from one or more nodes 102, 106, 107 within the communication network 100 and transmits signals to the one or more nodes 102, 106, 107 within the communication network 100. The antenna 205 is coupled to the transceiver 210, which employs conventional demodulation techniques for receiving and transmitting communication signals, such as packetized signals, to and from the communication device 200 under the control of the processor 215. The packetized data signals can include, for example, voice, data or multimedia information, and packetized control signals, including node update information. When the transceiver 210 receives a command from the processor 215, the transceiver 210 sends a signal via the antenna 205 to one or more devices within the communication network 100. In an alternative embodiment (not shown), the communication device 200 includes a receive antenna and a receiver for receiving signals from the communication network 100 and a transmit antenna and a transmitter for transmitting signals to the communication network 100. It will be appreciated by one of ordinary skill in the art that other similar electronic block diagrams of the same or alternate type can be utilized for the communication device 200.

IEEE 802.11s recommends [802.11s Requirements] using an IEEE 802.11 MAC DATA header to forward packets in multihop wireless networks. Hence the multihop packet forwarding is done in the MAC layer itself and is transparent to higher layers which see the 802.11s mesh as a single local area network (LAN) segment. Devices which are not forwarding capable or non-routable (e.g. 802.11 stations (STAs)) are proxied by routable devices (e.g. an access point (AP) capable of routing). Typically, the routable device takes care of forwarding packets on behalf of the non-routable device. This eliminates the need of maintaining/running any routing protocols at the end stations and provides backward compatibility with IEEE 802.11. For example, when the node 200 is a routable device, the node 200 can include a routing manager 230 as illustrated in FIG. 2 for forwarding packets on behalf of non routable stations within the network 100.

In accordance with the present invention, when the node 200 is a routable device, the processor 215 includes the routing manager 230 for managing packet forwarding within the communication network 100. It will be appreciated by those of ordinary skill in the art that the routing manager 230 can be hard coded or programmed into the node 200 during manufacturing, can be programmed over-the-air upon customer subscription, or can be a downloadable application. It will be appreciated that other programming methods can be utilized for programming the routing manager 230 into the node 200. It will be further appreciated by one of ordinary skill in the art that route manager 230 can be hardware circuitry within the node 200. In accordance with the present invention, the routing manager 230 can be contained within the processor 215 as illustrated, or alternatively can be an individual block operatively coupled to the processor 215 (not shown).

The node 200 further includes a counter 250 coupled to the processor 215. In operation, the processor 215 generates a sequence number for each data packet using sequence numbers assigned from the counter 250, starting at zero (0) and incrementing by one (1) for each data packet. For example, when the node is a non-routable device, the processor 215 can generate a one-hop sequence number to be associated with each generated data packet. Further, in accordance with the present invention, when a node that is a routable device (i.e. proxy node) receives a data packet from a non-routable device with the one-hop sequence number, the routing manager 230 of the routable device utilizes the one-hop sequence number (i.e. included in the packet data frame field 440 of FIG. 4) to be the end-to-end groupcast sequence number (i.e. included in the data frame field 450 of FIG. 4) for forwarding the groupcast traffic originated from the non-routable device. Alternatively, when the node 200 is a routable device, the routing manager 230 can generate an end-to-end sequence number using the counter 250 to identify a groupcast packet originated by the routable device.

To perform the necessary functions of the node 200, the processor 215 and/or the routing manager 230 are each coupled to the memory 220, which preferably includes a random access memory (RAM), a read-only memory (ROM), an electrically erasable programmable read-only memory (EEPROM), and flash memory. The memory 220 includes storage locations for the storage of one or more identifying address 235 such as the MAC address of the node 200. The memory 220, in accordance with the present invention, further includes storage locations for the storage of a current proxy node 255 and associated information. When the node 200 is a routable device, the memory 220, in accordance with the present invention, further includes storage locations for the storage of a proxy table 240, and a routing table 245.

It will be appreciated by those of ordinary skill in the art that the memory 220 can be integrated within the node 200, or alternatively, can be at least partially contained within an external memory such as a memory storage device. The memory storage device, for example, can be a subscriber identification module (SIM) card. A SIM card is an electronic device typically including a microprocessor unit and a memory suitable for encapsulating within a small flexible plastic card. The SIM card additionally includes some form of interface for communicating with the node 200.

Figure 3:
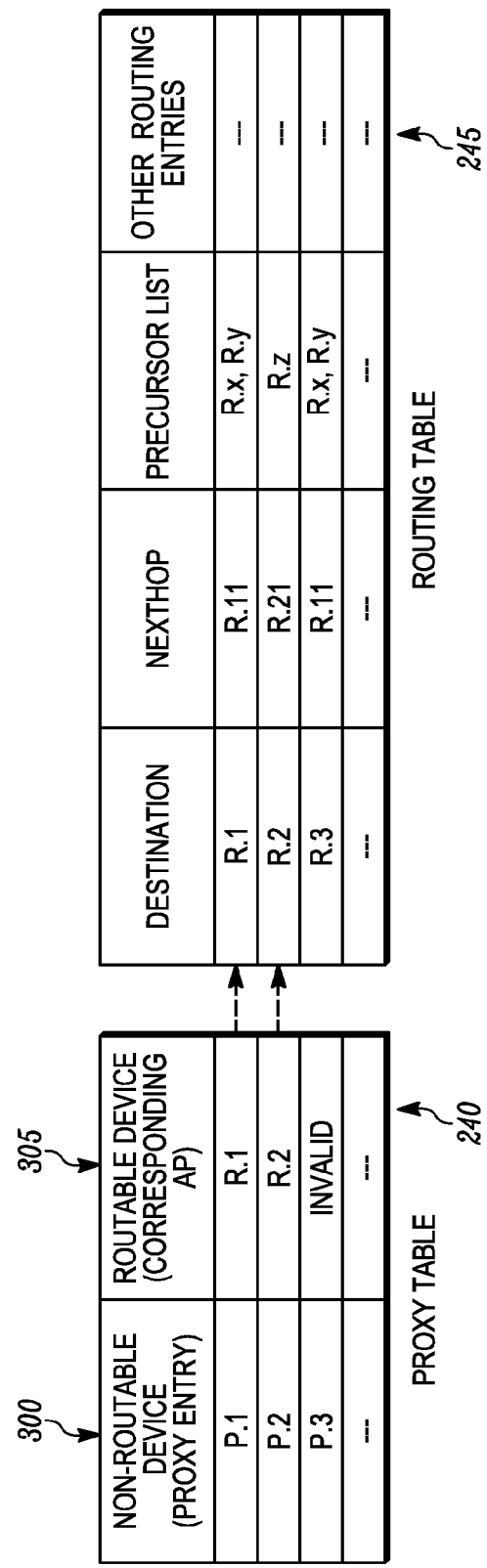
FIG. 3 is a block diagram illustrating a proxy table and a routing table for use within the mobile node of FIG. 2.

A typical layout of the proxy table 240 and the routing table 245 maintained at each routable device such as the node 200 is illustrated in FIG. 3. The routing table 245 and the proxy table 240 are maintained to identify a non-routable device 300 and its corresponding AP (routable device) 305. These tables can also be combined to create a single forwarding table.

The proxy table 240 typically contains an entry for each device that is associated with the node 200 (i.e. each device that is being proxied by the node 200). A node 200 can also have nodes or devices associated with it through a wired Ethernet port or through some other wired/wireless protocol like IEEE 802.15, Token Ring, or the like as can be appreciated by one skilled in the art. A proxy table 240 of a node may also contain entries for non-meshed devices that are associated with other nodes but use that node as an intermediate node to communicate with other devices in the network. Each entry in the proxy table 240 may include one or more of the following pieces of information (not shown):

Device media access control (MAC) Address (if MAC addressing scheme is used)

Device IP address (if IP addressing scheme is used)

Device ID (if an addressing scheme other than IP or MAC is used)

Static or Dynamic Entry (i.e. whether the entry is static or dynamic)

Associated AP address (the address can be MAC address, Internet Protocol (IP) address or other device identification (ID) depending on which addressing scheme is used—this entry is used if node is maintaining association information for non-meshed nodes associated with other AP. This is useful when a four (4) addressing scheme is used in the network)

Expiration time of the entry

As described herein, non-meshed devices are proxied by meshed devices. Each meshed device maintains the proxy table 240 and the routing table 245 as, for example, illustrated in FIG. 3. The routing table 245 maintains routes to other meshed devices. The node 200 constantly updates its routing table 245 so as to maintain a consistent and up-to-date view of the network. When the network topology changes the nodes propagate update messages throughout the network in order to maintain consistent and up-to-date routing information about the whole network. These routing protocols vary in the method by which the topology change information is distributed across the network and the number of necessary routing-related tables.

The routing manager 230 of the node 200 consults both the proxy table 240 and the routing table 245 to determine how to forward a data packet it has either generated or has received.

Figure 4:
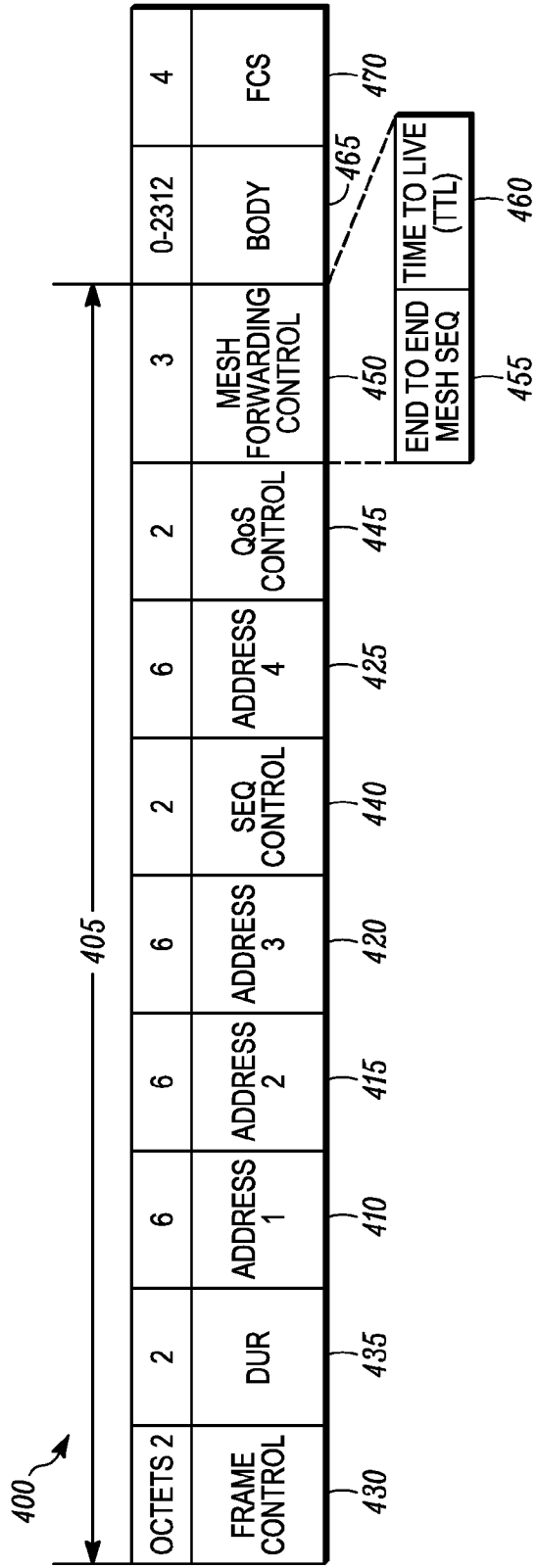
FIG. 4 illustrates an exemplary DATA frame format in accordance with some embodiments of the present invention.

FIG. 4 illustrates an exemplary 802.11s DATA Frame Format 400. As illustrated in FIG. 4, the DATA frame format 400 includes a MAC DATA header 405. The MAC DATA header 405 includes address fields 410, 415, 420, 425 which can be utilized for identifying MAC addresses associated with the routing of various communication packets. As will be appreciated by those of ordinary skill in the art, the MAC DATA header 405 further includes a frame control 430, a duration 435, a sequence control 440, a quality of service (QoS) control 445, and a Mesh Forwarding control 450. The sequence control 440 includes a fragment number and a sequence number to avoid communication of duplicate packets for a one-hop unicast packet. The Mesh Forwarding control 450 includes an end-to-end sequence number 455 to avoid communication of duplicate packets for a multi-hop groupcast packet, and a time to live (TTL) 460 to control the propagation range of the multi-hop groupcast packet. The DATA frame format 400 further includes a packet body 465 and a frame check sum (FCS) 470.

Figure 5:
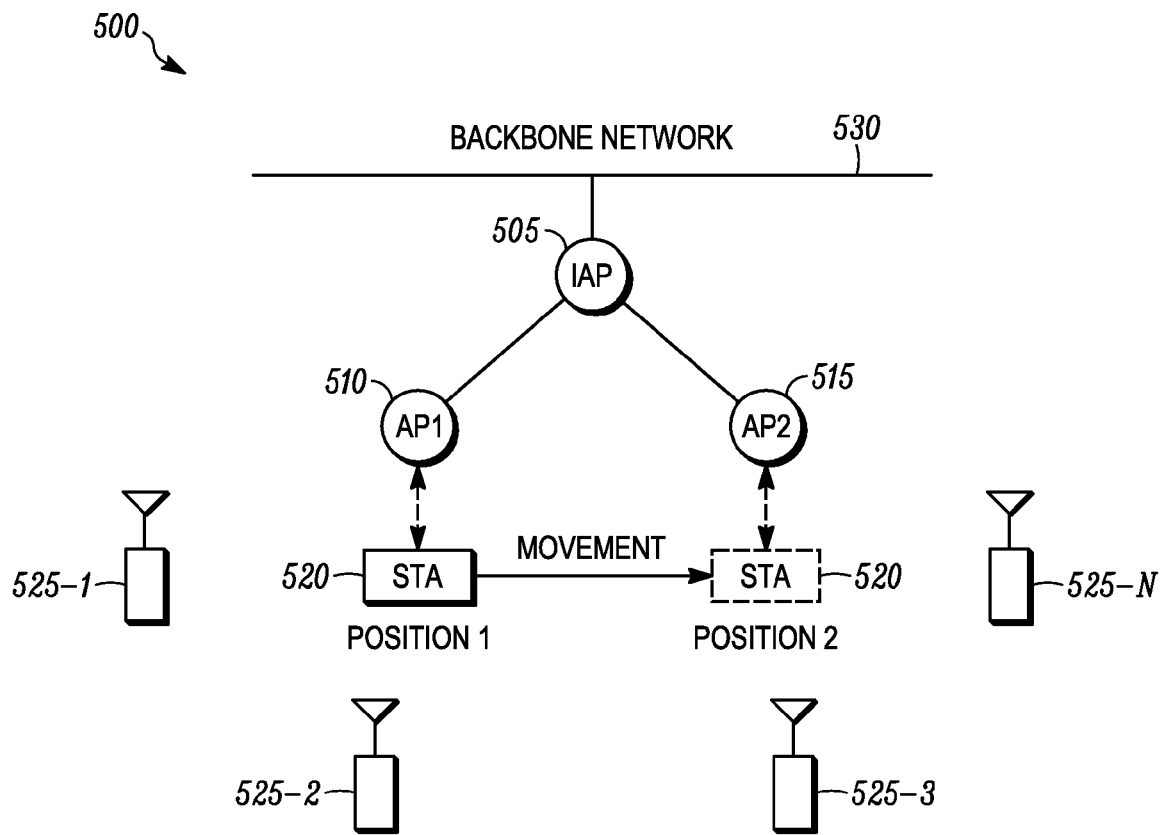
FIG. 5 is a block diagram illustrating an exemplary network operating in accordance with some embodiments of the present invention.

FIG. 5 illustrates an exemplary network 500 for application of some embodiments of the present invention. As illustrated in FIG. 5, the network 500 includes an intelligent access point (IAP) 505, at least two access points AP1 510, AP2 515, and at least one station (STA) 520. The IAP 505 is a portal into a backbone network 530 such as a layer 2 distribution system (L2 DS(Ethernet)). As illustrated, the two access points 510, 515 are bound to the IAP 505. STA 520, as illustrated, at position 1, is proxied by AP1 510, which forwards data packets to the backbone network 530 via IAP 505. It will be appreciated by those of ordinary skill in the art, for example, that STA 520 and AP1 510 are communicatively coupled through a wireless link. In other words, packets sent from STA 520 are forwarded through AP1 510. It will be appreciated by those of ordinary skill in the art that STA 520 is capable of generating two types of packets unicast packets and groupcast packets. As will further be appreciated by those of ordinary skill in the art, when an AP receives a unicast packet for some unknown destination it generates a route Request (RREQ) to find the route to the destination. RREQ packets, although broadcast, are generated by the AP and hence they can use the AP sequence number for the sequence number 440 of the DATA frame 400, and use the AP maintained end-to-end groupcast sequence number for the end-to-end sequence number 455 of the DATA frame 400.

When, at position 1, the STA 520 generates a groupcast packet, AP1 510 receives and forwards the groupcast packet to other nodes in the network such as nodes 525-N. In conventional systems, for example, AP1 510 uses its own end-to-end groupcast sequence number to forward the groupcast packet. It will be appreciated by those of ordinary skill in the art after AP1 510 forwards the groupcast packet, STA 520 may move away from AP1 510, to position 2, and be handed off to AP2 515. Similarly, AP1 510 may move away from STA 520 to a new position (not shown), and thereafter STA 520 may be handed off to AP2 515. Similarly, both STA 520 and AP1 510 can move away from each other causing STA 520 is handed off to AP2 515. In each of these cases, the use of AP1's sequence number as in conventional systems can cause data packet loss. For example, in a situation where AP1's current end-to-end groupcast sequence number is 100, and AP2's end-to-end groupcast sequence number is 50, when STA 520 is handed off to AP2 515 intermediate nodes will drop the next 50 packets assuming that they have already being forwarded. One solution is to tie the end-to-end groupcast sequence number with the AP MAC address. (i.e. tie the end-to-end groupcast sequence number of the groupcast packet generated by STA 520 in position 1 to the MAC address for AP1 510) In this way intermediate nodes will use the AP1's MAC address and AP1's end-to-end groupcast sequence number to avoid the duplicate packets before forwarding the groupcast packet. However this has limitation of its own. Now each data packet needs another MAC address field to include the forwarding AP addresses of the AP which started the groupcast. Since the MAC header has only four addresses, this may be an issue in presence of multiple portals. Hence the groupcast packet forwarding mechanism is critical to network operation.

The network of FIG. 5, for example, can be a network in which a non-routable originator is associated and communicating with an AP wirelessly following 802.11 standards or other wireless network standards. This 802.11 wireless non-routable originator is a mobile device and can handoff from one AP to another AP from time to time.

Figure 6:
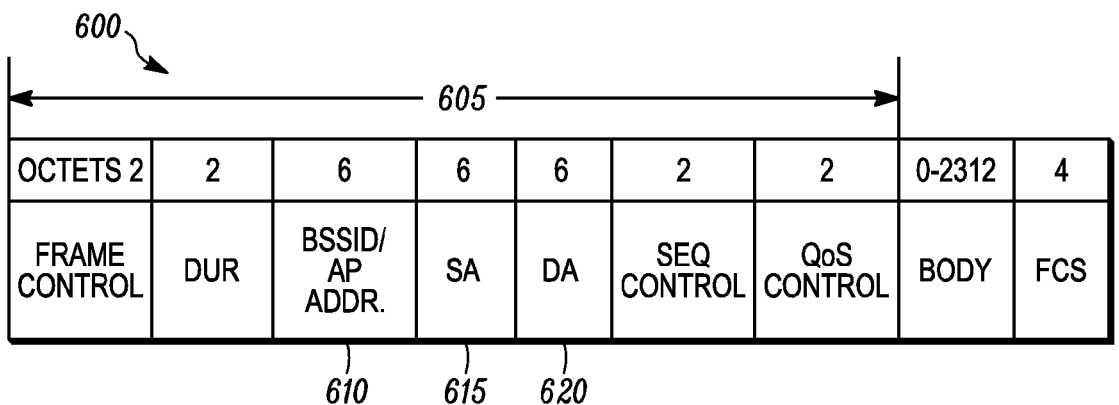
FIG. 6 illustrates an alternate exemplary DATA frame format in accordance with some embodiments of the present invention.

When a non-routable device generates a groupcast data frame, it will unicast the groupcast data frame to its associated routable device AP by setting the "ToDS" bit (i.e. indicating that the packet is destined for the distribution service set.) in the frame control field 430 in the data MAC header 405. The sequence number in this unicast packet is assigned using an independent counter, starting at 0 and incrementing by 1 for each MAC service data unit (MSDU) or MAC management protocol data unit (MMPDU). The data frame format follows the basic service set (BSS) data frame format 600 shown in FIG. 6.

In the MAC header 605 of the BSS data frame 600, the address 1 610 is the basic service set identification (BSSID), and it is equal to the MAC address of the routable device AP. that the non-routable device is associated with. The address 2 "SA" 615 is the source address which is the MAC address of the non-routable device. The address 3 "DA" 620 is the destination address which is a groupcast address in this case.

Figure 7:
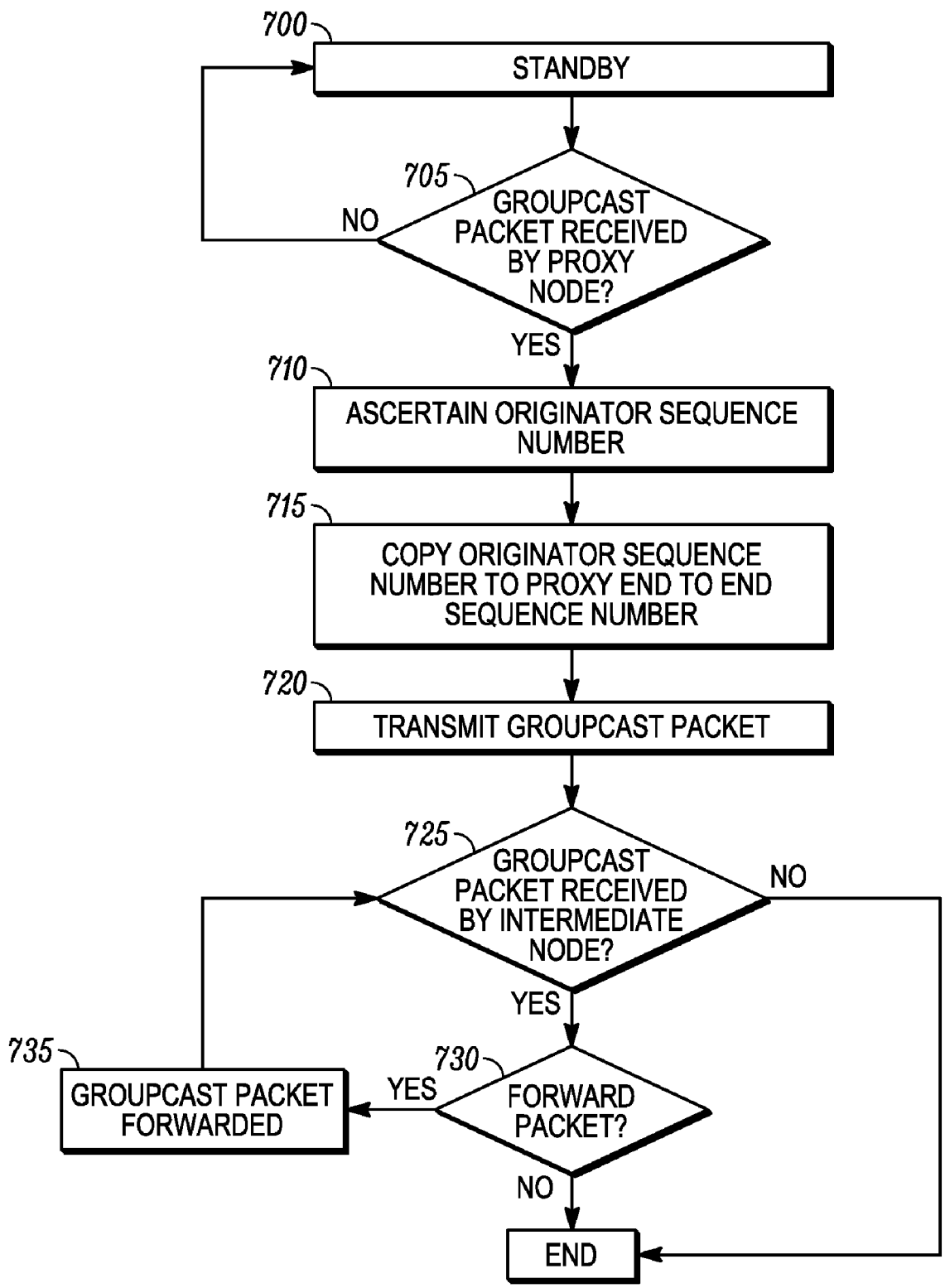
FIG. 7 is a flowchart illustrating an exemplary method of operation of the network of FIG. 5 in accordance with some embodiments of the present invention.

FIG. 7 illustrates the operation of a network such as the network 500 in accordance with the present invention. Specifically, FIG. 7 illustrates a method for handling end-to-end groupcast sequence number assignment for groupcast packet forwarding which does not need additional addresses in the data packet. For example, FIG. 7 illustrates the operation of the routing manager 230 of various nodes 200 within a network in forwarding a groupcast data packet.

The operation of FIG. 7 begins with the proxy node in standby 700. Next, at Step 705, the proxy node determines whether or not it has received a groupcast packet. When a proxy node receives a packet from the non-routable device in the BSS frame format 600, it determines whether or not it has received a groupcast packet for forwarding by checking the address 3 "DA" 620 field. For example, the AP1 510 of FIG. 5 can receive a groupcast packet for forwarding from the STA 520. When no groupcast packet has been received, the operation cycles back to standby 700 and periodically again checks for groupcast packet receipt 705.

When a groupcast packet has been received, the proxy node next ascertains the current sequence number used by the originator of the groupcast data packet in Step 710. For example, after receiving a groupcast packet from the STA 520, AP1 510 ascertains the current sequence number of the STA 520. Next, in Step 715, the node 200 copies the originator sequence number to the packet being forwarded by itself to its end to end groupcast sequence number filed in the Mesh Forwarding control 450 in the DATA frame format 400. In other words, in accordance with the present invention, groupcast packets are forwarded by a proxy node using the originating device's current sequence number. The source of the groupcast packet (address 3 615 in the IEEE 802.11 MAC header for the BSS data frame format 600, and address 4 425 in the IEEE 802.11s MAC header for the wireless distribution system (WDS) data frame format (DATA frame format 400)) being forwarded by the proxy node remains set to the originator's address. Next, in Step 720, the groupcast packet is broadcasted to other intermediate nodes within the network.

Next, in Step 725, it is determined whether an intermediate node has received the groupcast packet. When no intermediate node receives the groupcast packet, this operation ends. When an intermediate node receives the groupcast packet, the operation continues to Step 730 in which the intermediate node uses the values for the originating device address and the end-to-end groupcast sequence number in the Mesh Forwarding Control field 450 to determine if the received groupcast packet is a duplicate. The intermediate node makes the decision to forward the received groupcast packet when it determined not to be a duplicate; and does not forward the received groupcast packet when it is determined to be a duplicate. In this manner, referring to FIG. 5, when STA 520 moves away from AP1 510 and is handed off to AP2 515, groupcast packets generated by STA 520 still have a valid originating device and the end-to-end groupcast sequence number associated therewith and packet forwarding to the nodes 525 is done without creating any loop or packet drop because of wrong sequence numbers. When the groupcast packet is not to be forwarded, the operation ends. When the groupcast packet is to be forwarded, the operation continues to Step 735 and the groupcast packet is processed by the next intermediate node(s) using the operations beginning at Step 725.

A beneficial implementation of the present invention is its application to IEEE 802.11 with four address fields available to forward packets in a multihop scenario. Those of ordinary skill in the art will appreciate that two of these address fields are used to identify the immediate next hop and the node presently forwarding the packet. One address is used to uniquely identify the original source of the groupcast packet. Hence there is only one available address remaining. For groupcast packet forwarding, if an AP uses this address to uniquely identify itself and its end-to-end groupcast sequence number, it will have no additional address remaining to distinguish between different portals within its range. This may create looping problems wherein packets from one IAP through the wireless distributed system (WDS) will reach the other IAP and from the layer 2 distribution system (L2 DS) (Ethernet) will be sent back. In one way, the fourth address available helps in creating an independent layer 2 in the WDS in which groupcast packets are not sent from one IAP to another and should not be used to identify an AP. For example, the available address can be used for the address of AP proxying for the originator node. Alternatively, the address of the portal that the originator is bound to can be within the remaining address field to stop the groupcast traffic crossing the portal boundary.

Figure 8:
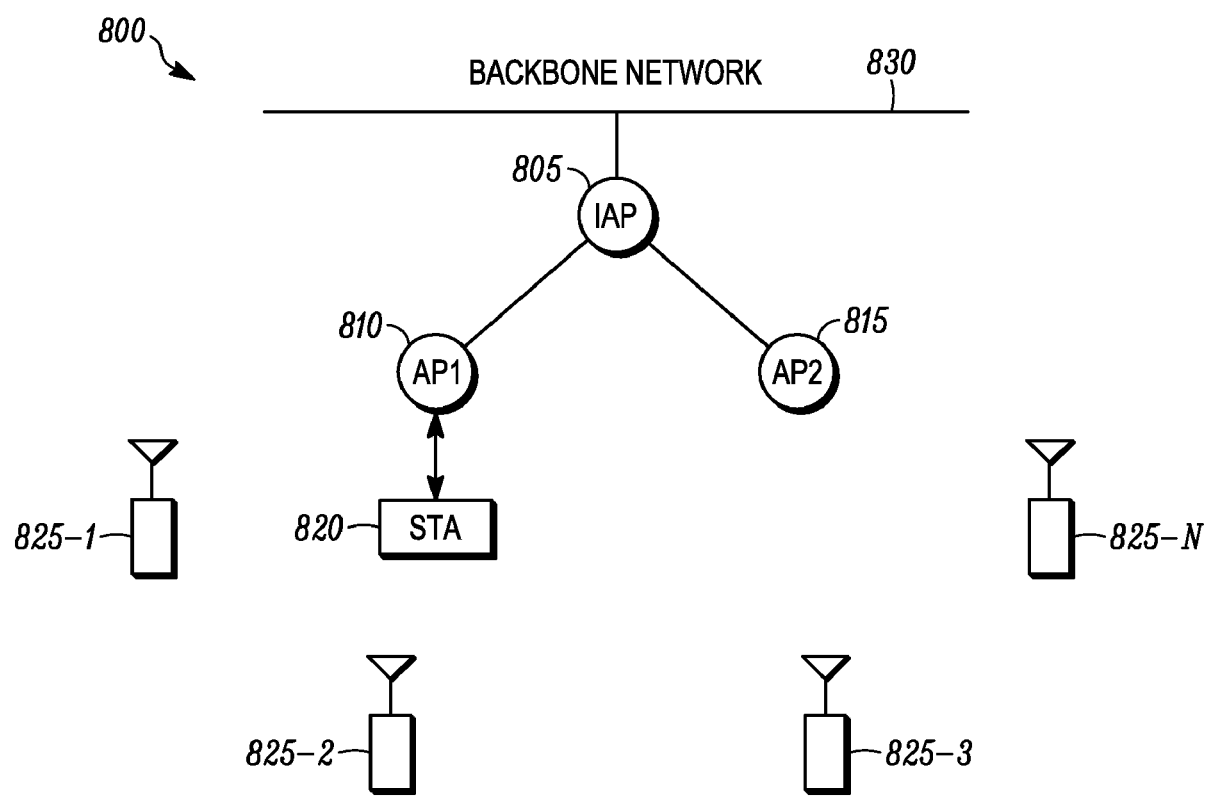
FIG. 8 is a block diagram illustrating an alternate exemplary network operating in accordance with some embodiments of the present invention.

FIG. 8 illustrates an exemplary network 800 for application of some embodiments of the present invention. As illustrated in FIG. 8, the network 800 includes an intelligent access point (IAP) 805, at least two routable access points AP1 810, AP2 815, and at least one stationary non-routable station (STA) 820. The IAP 805 is a portal into a backbone network 830 such as a layer 2 distribution system (L2 DS(Ethernet)). As illustrated, the two access points 810, 815 are bound to the IAP 805. STA 820 is proxied by AP1 810, which forwards data packets to the backbone network 830 via IAP 805. In other words, packets sent from STA 820 are forwarded through AP1 810.

The network of FIG. 8, for example, can be a network in which a static non-routable originator is communicating with a routable AP through the static Ethernet port following 802.3 standards or other wired LAN standards. This type of originator is a static device and has low probability to handoff from one AP to another AP.

In operation, when the AP1 810 receives the groupcast traffic from such a static originator STA 820, AP1 810 (proxying for the STA 820) will use the end-to-end groupcast sequence number maintained by AP1 810 to the end-to-end sequence number field 455. AP1 810 will use the MAC address of the static originator STA 820 to the address 4 425 in the DATA frame format 400 to identify the original source of the groupcast packet. An intermediate node 825 will use the static originator STA's address and the end-to-end groupcast sequence number to detect duplicate packets.

The present invention provides a mechanism by which a routable device can forward groupcast packets generated by a non-routable device. This mechanism is especially beneficial for four address based forwarding, otherwise the system will end up having loops, and a problem of unwanted packet drops. The scheme is built on top of IEEE 802.11 and hence can be used as mechanism to forward packet in multihop wireless systems (802.11s).

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for data packet forwarding in a wireless network comprising: communicating a data packet including an originator node sequence number and an originator node address from an originator node to a proxy node;
forwarding the data packet from the proxy node to at least one route node, wherein the forwarded data packet includes the originator node sequence number and the originator node address, wherein the wireless network is an 802.11 network, and further wherein the data packet comprises:
an immediate next hop address,
a current node address,
the originator node address, and
an available address, and
an end-to-end sequence number field, wherein the originator node sequence number is contained within the end-to-end sequence number field; and forwarding the data packet by the at least one route node based on the originator node sequence number and the originator node address.

2. A method for data packet forwarding as claimed in claim 1, wherein the available address includes one or more of the addresses selected from a group comprising a proxy node address identifying the proxy node and a portal address identifying a portal that the originator node is bound to.

3. A method for data packet forwarding in a wireless network comprising: communicating a data packet including an originator node sequence number and an originator node address from an originator node to a proxy node; and forwarding the data packet from the proxy node to at least one route node, wherein the forwarded data packet includes the originator node sequence number and the originator node address; in the at least one route node: receiving the forwarded data packet; determining whether to forward the forwarded data packet using the originator node sequence number and the originator node address; and forwarding the data packet based on the determining operation.

4. A method for data packet forwarding in a wireless network comprising: unicasting a groupcast packet including an originator node sequence number and an originator node address from an originator node to a proxy node; broadcasting the groupcast packet from the proxy node to at least one route node, wherein the forwarded data packet includes the originator node sequence number and the originator node address determining by the at least one route node whether to forward the data packet using the originator node sequence number and the originator node address; and forwarding by the at least one route node the data packet based on the determining operation.

5. A method for data packet forwarding as claimed in claim 4, wherein the unicast data packet follows a basic service set frame format, wherein the communicating step further comprises at the originator node:
setting a TODS bit in a Frame Control field in a MAC header of the basic service set frame format, and
inserting the originator node sequence number.

6. A method for data packet forwarding as claimed in claim 5, wherein the forwarded data packet follows a wireless distribution system frame format, the method further comprising at the proxy node:
receiving the unicast packet from the originator node;
copying the originator node sequence number in the unicast packet to an end-to-end sequence number in a Mesh Forwarding Control field in a media access control header of the media access control frame format, and
using the originator's address as a source address of the groupcast packet.

7. A multi-hop wireless network comprising: an originator node configured to generate a data packet; a proxy node communicatively coupled to the originator node, the proxy node configured to receive and forward the data packet including an originator node address and a proxy node sequence number for an end-to-end groupcast sequence number; and at least one other node communicatively coupled to the proxy node, the at least one other node configured to receive the forwarded data packet.

8. A multi-hop wireless network as claimed in claim 7, wherein the groupcast data packet comprises a data packet destined to a group of nodes selected from a group comprising all nodes in the network and a subset of nodes in the network.

9. A multi-hop wireless network as claimed in claim 7, wherein the multi-hop wireless network is an 802.11 network, and further wherein the groupcast data packet comprises:
an immediate next hop address,
a current node address,
an originator node address, and
an available address, and
an end-to-end sequence number field, wherein the originator node sequence number is contained within an end-to-end sequence number sub-field in a Mesh Forwarding Control field.

10. A multi-hop wireless network as claimed in claim 9, wherein the available address includes one or more of the addresses selected from a group comprising a proxy node address identifying the proxy node and a portal address identifying a portal that the originator node is bound to.

11. A multi-hop wireless network as claimed in claim 7, wherein the at least one other node is configured to use the originator node sequence number inserted in the end-to-end sequence number sub-field in the Mesh Forwarding Control field and the originator node address in the received forwarded groupcast data packet to determine whether to further forward the forwarded groupcast data packet to the at least one other node in its neighborhood.

12. A multi-hop wireless network as claimed in claim 7, wherein the data packet comprises a groupcast packet, wherein the originator node is configured to unicast the data packet to the proxy node, and wherein the proxy node is configured to broadcast the forwarded data packet to the at least one other node.

13. A multi-hop wireless network as claimed in claim 12, wherein the unicast data packet follows a basic service set frame format comprising: a TODS bit in a Frame Control field in a MAC header of the basic service set frame format, and an originator node sequence number in a sequence control field in a MAC header of the basic service set frame format.

14. A multi-hop wireless network as claimed in claim 13, wherein the forwarded data packet follows a wireless distribution system frame format comprising the originator node sequence number entered into to an end-to-end sequence number in a Mesh Forwarding Control field in a media access control header of the media access control frame format, and the originator's address as a source address of the groupcast packet.

15. A multi-hop wireless network comprising:
a mobile non-routable node; a first access point communicatively wirelessly coupled to the mobile non-routable node, the first access point configured to forward a groupcast packet comprising an address and a sequence number associated with the mobile non-routable node when the mobile non-routable node is located in a first position; a second access point communicatively wirelessly coupled to the mobile non-routable node, the second access point configured to proxy for the mobile non-routable node when the mobile non-routable node is located in a second position; and at least one other node configured to process the forwarded groupcast packet using the address and sequence number associated with the mobile non-routable node when the mobile non-routable node is in the second position, the process including: determining by the at least one node whether to forward the forwarded groupcast packet using the address and sequence number associated with the mobile non-routable node; and forwarding by the at least one node the forwarded groupcast packet based on the determining operation.

16. A multi-hop wireless network comprising:

a stationary non-routable node; a mobile access point communicatively coupled to the stationary non-routable node, the mobile access point configured to forward a groupcast packet comprising an address and a sequence number associated with the stationary non-routable node when the mobile access point is located in a first position; a second access point communicatively coupled to the stationary non-routable node, the second access point configured to proxy for the stationary non-routable node when the mobile access point is located in a second position; and at least one other node configured to process the forwarded groupcast packet using the address and sequence number associated with the stationary non-routable node when the mobile access point is in the second position, the process including: determining by the at least one other node whether to forward the forwarded groupcast packet using the address and sequence number associated with the stationary non-routable node; and forwarding by the at least one other node the forwarded groupcast packet based on the determining operation.

17. A wireless multi-hopping network comprising:

a stationary non-routable device; a routable device coupled to the stationary non-routable device through a wired connection and co-located with the stationary non-routable device, wherein the routable device is configured to forward a groupcast packet originated from the stationary non-routable device using a sequence number of the routable device and using the address of the non-routable device as the source address of the groupcast packet; and at least one other device configured to: receive the groupcast packet; determine whether to forward the groupcast packet using the sequence number of the routable device and the address of the non-routable device; and forward the forwarded groupcast packet based on the determining operation.

18. A wireless multi-hopping network as claimed in claim 17, wherein the routable device is a stationary routable device.

19. A wireless multi-hopping network as claimed in claim 17, wherein the routable device is a mobile routable device.

* * * * *